United States Patent
Palomares Rentero

(10) Patent No.: US 9,797,375 B2
(45) Date of Patent: Oct. 24, 2017

(54) BLADE PITCH SYSTEM WITH A DUAL WINDING ACTUATOR

(75) Inventor: Pedro Palomares Rentero, Barcelona (ES)

(73) Assignee: ALSTOM RENEWABLE TECHNOLOGIES, Grenoble (FR)

(*) Notice: Subject to any disclaimer, the term of this patent is extended or adjusted under 35 U.S.C. 154(b) by 700 days.

(21) Appl. No.: 14/007,944

(22) PCT Filed: Mar. 28, 2012

(86) PCT No.: PCT/EP2012/055496
§ 371 (c)(1),
(2), (4) Date: Sep. 26, 2013

(87) PCT Pub. No.: WO2012/130871
PCT Pub. Date: Oct. 4, 2012

(65) Prior Publication Data
US 2014/0017082 A1 Jan. 16, 2014

(30) Foreign Application Priority Data
Mar. 29, 2011 (EP) .................................. 11382085

(51) Int. Cl.
*F03D 7/02* (2006.01)
*F03D 13/20* (2016.01)

(52) U.S. Cl.
CPC ........... *F03D 7/0224* (2013.01); *F03D 13/20* (2016.05); *Y02E 10/723* (2013.01); *Y02E 10/728* (2013.01)

(58) Field of Classification Search
CPC ...... F03D 7/022; F03D 7/0224; F03D 7/0228; F03D 7/024; F03D 1/0675; F03D 1/0691;
(Continued)

(56) References Cited

U.S. PATENT DOCUMENTS 5,239,251 A 8/1993 Lauw
6,158,553 A * 12/2000 Oshima ................... H02P 25/22
187/293
(Continued)

FOREIGN PATENT DOCUMENTS

DE 10 2007 049313 4/2009
EP 1 286 048 2/2003
(Continued)

OTHER PUBLICATIONS

"Quotation KEB P6 Pitch System-Clipper 10MW Turbine" Filed Third Party Observation in EP2505833A1, date: Sep. 2, 2010, 9 pgs.
(Continued)

*Primary Examiner* — Gregory Anderson
*Assistant Examiner* — Julian Getachew
(74) *Attorney, Agent, or Firm* — Dority & Manning, PA

(57) ABSTRACT

In a first aspect, the present invention provides a blade pitch system for a wind turbine, comprising at least one multi winding motor comprising a main independent set of control windings and at least one auxiliary independent set of control windings; and at least a main independent power electronic converter for controlling the main independent set of control windings, and an auxiliary independent power electronic converter for controlling the auxiliary independent set of control windings.

6 Claims, 5 Drawing Sheets

(58) Field of Classification Search
CPC . F05B 2260/74; F05B 2260/76; Y02E 10/723
See application file for complete search history.

(56) References Cited

U.S. PATENT DOCUMENTS

| | | | |
|---|---|---|---|
| 6,166,469 A | 12/2000 | Osama et al. | |
| 7,095,207 B1 * | 8/2006 | Min | H02P 1/44 318/763 |
| 7,098,619 B2 * | 8/2006 | Stridsberg | B64C 13/00 244/195 |
| 7,355,294 B2 * | 4/2008 | Teichmann | F03D 7/0224 290/44 |
| 7,717,673 B2 | 5/2010 | Menke | |
| 2006/0006824 A1 | 1/2006 | Stridsberg | |
| 2006/0125433 A1 | 6/2006 | Kamen et al. | |
| 2007/0267872 A1 | 11/2007 | Menke | |

FOREIGN PATENT DOCUMENTS

| | | |
|---|---|---|
| EP | 2 290 230 | 3/2011 |
| WO | WO 2006/032438 | 3/2006 |
| WO | WO 2009/049934 | 4/2009 |
| WO | WO 2010/061918 | 6/2010 |

OTHER PUBLICATIONS

International Search Report for PCT/EP2012/055496, dated May 7, 2012, 13 pgs.

\* cited by examiner

BLADE PITCH SYSTEM WITH A DUAL WINDING ACTUATOR

This application claims the benefit of European Patent Application EP 11382085.6 filed on Mar. 29, 2011.

The present invention relates to a blade pitch system for a wind turbine and to a method for operating said blade pitch system.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven wind turbine" or "direct drive wind turbine") or through the use of a gearbox.

An important auxiliary system generally provided on wind turbines is a pitch system. Pitch systems are employed for adapting the position of a wind turbine blade to varying wind conditions by rotating the blade along its longitudinal axis. In this respect, it is known to rotate a wind turbine blade in such a way that it generates less lift (and drag) when the wind speed increases. This way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance, or to prevent damage to the wind turbine under extremely high wind speed conditions.

Many pitch systems comprise an electric motor in the hub which drives an actuating gear. Said actuating gear (pinion) meshes with an annular gear provided on the wind turbine blade to set the wind turbine blade into rotation. It is also possible however, that the annular gear is provided on the hub, whereas the electric motor and actuator are mounted on the blade. Yet other actuating mechanisms, such as e.g. involving hydraulic actuators, are also known.

It is further known to provide an individual pitch system (comprising e.g. a separate motor and separate control) for each wind turbine blade of a rotor. It is also known to provide a common pitch system wherein the pitch angle of the blades is the same for all blades on a rotor. Such a common pitch system may comprise a single motor or may comprise a plurality of motors, one for each blade.

A common control strategy of a pitch system in a variable speed wind turbine is to maintain the blade in a predefined "below rated pitch position" at wind speeds equal to or below nominal wind speed (for example approximately 4 m/s-15 m/s). Said default pitch position may generally be close to a 0° pitch angle. The exact pitch angle in "below rated" conditions depends however on the complete design of the wind turbine. Above the nominal speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. The nominal wind speed, cut-in wind speed and cut-out wind speed may of course vary depending on the wind turbine design.

These blade pitch systems usually comprise a controller of the blade's position which is powered by means of a main power line. When the controller fails or in case of grid loss, the blade pitch system may result inoperable and the related blade and/or the wind turbine may be damaged. Therefore, it is important that control of operation of the blade pitch system is maintained under all or almost all circumstances.

Different prior art systems aimed at improving the security and the reliability of blade pitch systems are known. Some of said prior art systems are based on a backup configuration comprising batteries, which are commonly used when DC motors with collectors are employed as pitch drives. However, this configuration generally cannot reliably control the speed of the pitch system, since said speed may depend on e.g. the state of charge of the batteries.

Some other prior art systems introduce redundant elements in a way that if a main element fails, a secondary equivalent element may assume the role of the main element. For example, U.S. Pat. No. 7,717,673B2 discloses a redundant and fail-safe blade pitch system of a wind turbine including at least one blade pitch drive and at least two power control modules for controlling the blade pitch drive. The power control modules are connected to the blade pitch drive by a switching unit which allows an alternative connection between the blade pitch drive and any of the power control modules.

When the redundant and fail-safe blade system of U.S. Pat. No. 7,717,673B2 comprises only one blade pitch drive and at least two related power control modules, a switching mechanism based on 2-way switches is required and there is always at least one unused power control module. When the redundant and fail-safe blade system comprises several blade pitch drives related to several power control modules, the switching mechanism based on 2-way switches becomes quite complex.

SUMMARY OF THE INVENTION

There thus still exists a need for new blade pitch systems and operating methods solving at least some of the above mentioned drawbacks. The object of the present invention is to fulfil such a need.

Said object is achieved with a blade pitch system according to claim 1, a first method for operating said blade pitch system according to claim 10, and a second method for operating said blade pitch system according to claim 12.

In a first aspect, the present invention provides a blade pitch system for a wind turbine, comprising at least one multi winding motor operationally connected to at least one actuator for changing a rotor blade pitch angle, said multi winding motor comprising a main independent set of control windings and at least one auxiliary independent set of control windings, and the blade pitch system further comprising at least a main independent power electronic converter for controlling the main independent set of control windings and an auxiliary independent power electronic converter for controlling the auxiliary independent set of control windings.

In this respect, the term "control winding" is used to indicate those windings of a motor which cause an electromagnetic field, which determine the performance of a motor. For example, in an AC synchronous motor with a permanent magnet rotor, the windings of the stator would clearly be the control windings. In another example, in an AC induction motor, the windings (of the stator) that are controlled and cause the induction of the windings on the rotor would be considered to be the control windings.

"Set of control windings" is used to refer to a set of windings which is controlled by the same power electronic converter. Such a set may include e.g. a single winding in a one phase implementation and may include three windings in a three-phase implementation.

This blade pitch system can offer very high reliability, since the auxiliary independent power electronic converters and their related auxiliary independent sets of control windings constitute a good backup in case of failure of (some of) the main components.

Moreover, in the blade pitch system of the invention, both the main and the auxiliary independent power electronic converters may on occasion operate simultaneously on their related sets of windings. Such a simultaneous operation allows, for example, increasing the power developed in the axis of the motor and, consequently, increasing the torque of the motor. This feature may be especially advantageous in situations for wherein e.g. a higher pitch velocity speed is required. Thus, the auxiliary independent power electronic converters may perform as a backup of the main converters and/or as a complementary system of the main converters.

In a second aspect, the present invention provides a method for operating a blade pitch system substantially as hereinbefore described comprising, for each multi winding motor for which the main independent power electronic converter is active, checking if said multi winding motor exceeds a predetermined load threshold; then, in case of said multi winding motor exceeding said predetermined load threshold, activating one of the auxiliary independent power electronic converters related to said multi winding motor. These operations which may be executed for each multi winding motor may be continuously repeated, so that a continuous monitoring of the multi winding motors may be established.

This method allows ensuring a continued and good performance of the blade pitch system in cases wherein an overload of some multi winding motor might otherwise occur.

In a third aspect, the present invention provides a method for operating a blade pitch system substantially as hereinbefore described, comprising, for each multi winding motor for which the main independent power electronic converter is active, checking the status of said active main independent power electronic converter; and, in case of detecting malfunction of said active main independent power electronic converter, activating one of the auxiliary independent power electronic converters related to said multi winding motor. These operations may be executed for each multi winding motor and may be continuously repeated, so that a continuous monitoring of the multi winding motors may be established.

This aspect of the invention allows ensuring continuous and good performance of the blade pitch system in case of failure of one or more of the main converters. Therefore, this method can also contribute to the reliability and performance of the blade pitch system of a wind turbine.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following descriptions, numerous specific details are set forth in order to provide a thorough understanding of the present invention. It will be understood, however, by one skilled in the art, that the present invention may be practiced without some or all of these specific details. In other instances, well known elements have not been described in detail in order not to unnecessarily obscure the description of the present invention.

Figure 1:
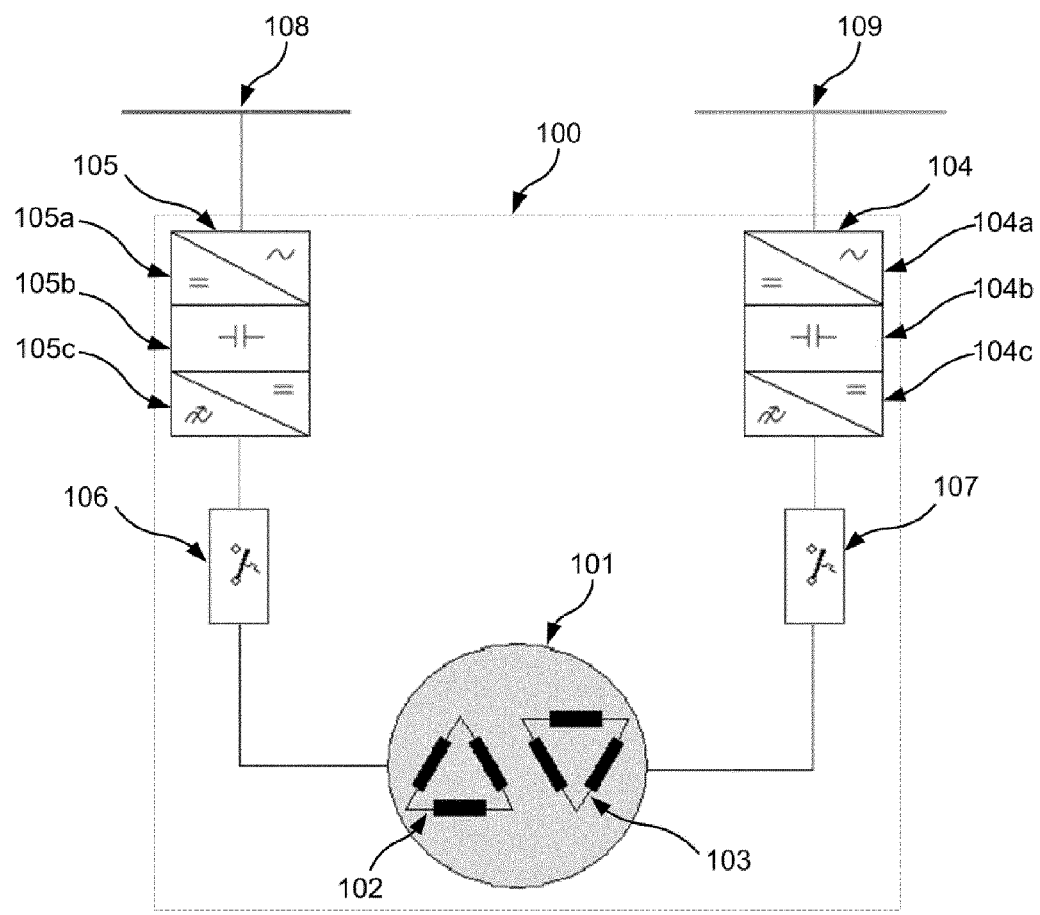
FIG. 1 is a schematic representation of a blade pitch system according to a first embodiment of the invention.

FIG. 1 schematically describes a first embodiment of the blade pitch system 100. In this particular embodiment, a multi winding motor 101 comprises a main independent set of control windings 102 and an auxiliary independent set of control windings 103. A main independent power electronic converter 105 for controlling the main independent set of control windings 102 is connected to a main power line 108. And an auxiliary independent power electronic converter 104 for controlling the auxiliary independent set of control windings 103 is connected to an auxiliary power line 109.

The blade pitch system of the invention may comprise a control unit (not shown), such as for example a PLC (Programmable Logic Controller), being programmed for producing the necessary signals for an optimal operation of the system. This control unit may control each of the provided power electronic converters to vary the speed of the pitch motors such that they assume a correct position in accordance with wind conditions and other circumstances.

Moreover, some protection systems 106 for the main converter 105 and windings 102 and some protection systems 107 for the auxiliary converter 104 and windings 103 are shown. These protection systems 106,107 may be based on means for interrupting or attenuating the electrical current/voltage, as for example fuses, on-off switches, push switches, and so on. These protection systems 106,107 may be of particular relevance in situations of e.g. electrical surge, in which case the components of the system may be damaged. The control unit may activate/deactivate the protection systems 106,107 by sending corresponding on-off signals. As these kinds of elements are generally well known in the technical field, no further detailed description will be provided in this context.

The converters 104,105 may comprise the necessary elements for converting AC power from the power lines 108,109 into DC power, and for finally converting said DC power into variable AC power, in accordance with the characteristics of the corresponding set of control windings and/or the power lines. For example, each converter 104;105 may comprise a rectifier 104a;105a, a DC link 104b;105b, and an inverter 104c;105c. In case of the auxiliary power line 109 being a DC power line, only conversion of DC power into variable AC power will be required (DC link 104b;105b, and inverter 104c;105c). As these kinds of converters are generally well known in the technical field, no further detailed descriptions will be provided. In the particular examples illustrated here, the pitch motors are assumed to be AC motors. The invention however is not limited to this particular choice as suitable multi winding DC motors may also be used.

The main power line 108 can supply power the main converter 105 and the auxiliary power line 109 can supply power to the auxiliary power line 109.

The operation of the system (managed by the control unit) may entail generally keeping the auxiliary converter 104 deactivated as long as the main converter 105 and main line 108 do not fail and/or the motor 101 is not overloaded. However, in case the main converter 105 fails, the auxiliary converter 104 may be activated in order to ensure that the operation of the system is not interrupted. Also, in case the main power line 108 falls or the connection to the main power line is lost, the system may continue its operation by using the auxiliary power line 109. The power from the auxiliary power line may be used for activating the auxiliary converter 104 and an auxiliary winding set 103.

In some implementations, the auxiliary converter 104 may also be activated e.g. when the motor 101 suffers an overload. This way, the load may be divided between the main 102 and auxiliary 103 sets of windings, thus consequently, improving the performance of the system. The control unit may activate/deactivate a particular converter 105;104 by sending the corresponding on-off signal to an on-off switch related to said converter.

The main power line 108 may generally form part of the medium voltage wind park grid. The auxiliary power line 109 may be provided in a wind park, especially for the purposes of powering auxiliary converters, when the main line fails.

Figure 2:
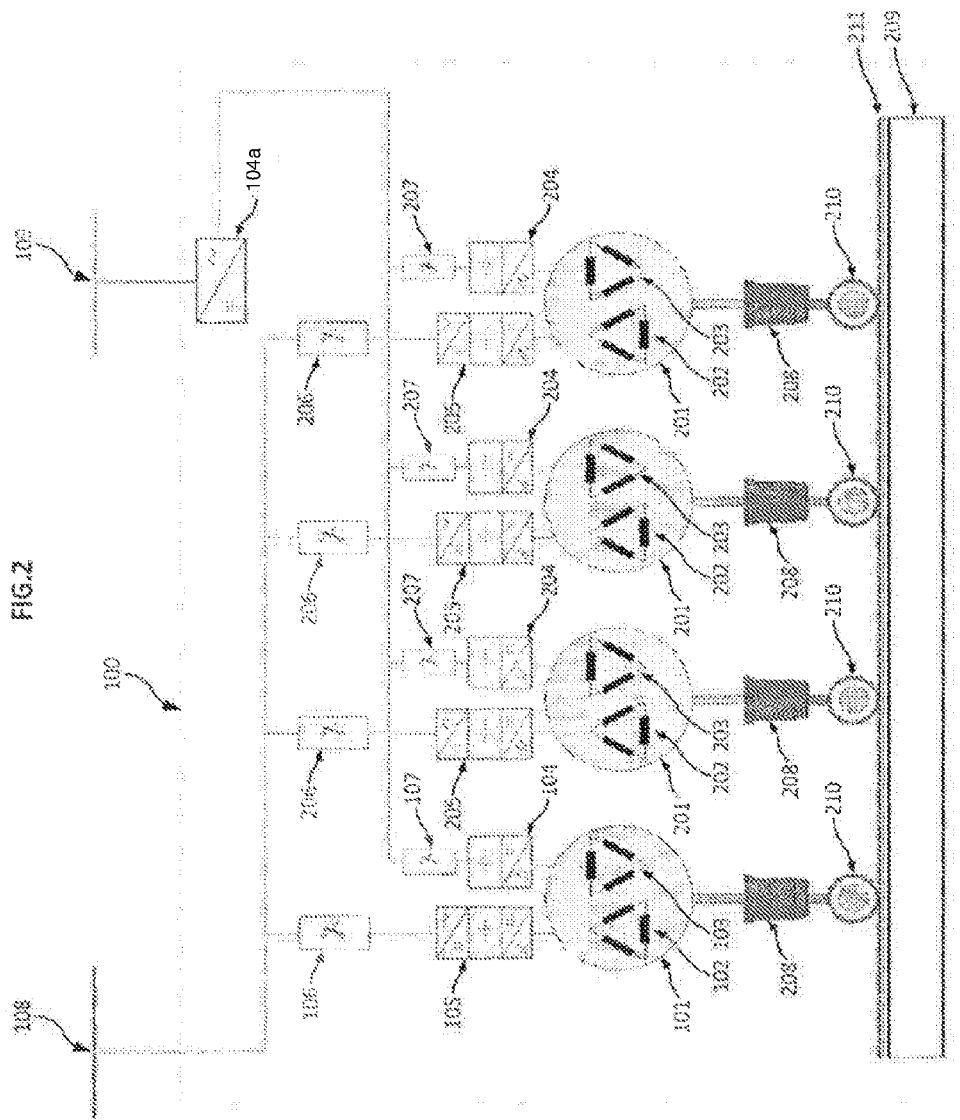
FIG. 2 is a schematic representation of a blade pitch system according to a second embodiment of the invention.

An aspect of the embodiment of FIG. 1 is that a double function is attributed to the auxiliary converter 104: it may work as a backup and/or as a complement of the main converter 105. This improves flexibility and performance of the system. Additionally, in this embodiment, no particularly complex switching mechanisms and complex related logic (implemented e.g. in the control unit) are required FIG. 2 schematically shows another embodiment of the invention. In this case, four multi winding motors 101,201 are used for actuating on a single blade. Each of the multi winding motors 101;201 comprises a main independent set of control windings 102;202 and an auxiliary independent set of control windings 103;203. Additionally, the system 100 comprises a main independent power electronic converter 105;205 for controlling the main independent set of control windings 102;202 of each of the motors. Furthermore, the blade pitch system 100 comprises an auxiliary independent power electronic converter 104;204 for controlling the auxiliary independent set of control windings 103;203 of each of the motors.

The embodiment of FIG. 2 is generally similar to the embodiment of FIG. 1. However, the embodiment of FIG. 2 comprises more than one multi winding motor 101,201 for each blade. The movement produced by each motor of said plurality of multi winding motors 101,201 may be transmitted through suitable transmission means comprising, for example, a gearbox 208 and a pinion 210 to an annular gear 211 provided at a root 209 of the blade.

This embodiment has the advantage of dividing the overall load for moving the blade into several motors 101,201, several pinions 210 and several portions of the annular gear 211. This allows decreasing the load of the related motor and may increase the durability of said pinions 210 and annular gear 211.

FIG. 2 shows four motors, but it will be clear that it is also possible to implement a system comprising, for example, two or three or any other number of motors. Obviously, increasing the number of motors implies a higher division of the overall load and, thus, a further reduction of the possibilities of any one of the motors being overloaded. Additionally, the redundancy within the system is improved.

The embodiment of FIG. 2 also shows protecting systems 106,107,206,207 for the main 105,205 and auxiliary 104, 204 independent power electronic converters. The structure and operation of said protecting systems 106,107,206,207 may follow the same principles described in reference to FIG. 1.

In FIG. 2, a common rectifier 104a (in charge of converting AC power into DC power) is shared by all the auxiliary converters 104; 204. Each of the auxiliary converters in this case comprises a DC link (comprising e.g. capacitors) and an inverter. The working principle of the converters and the system as a whole is further similar to the embodiment of FIG. 1.

In some embodiments of the invention, at least one of the multi winding motors 101;201 may comprise a plurality of auxiliary independent sets of control windings 103;203. This feature allows activating a first auxiliary converter if the main converter fails, and activating a second auxiliary converter if the first auxiliary converter fails, and so on. This embodiment and this way of operating may be particularly advantageous for e.g. offshore wind turbines for which maintenance may be complicated. Namely, the higher number of redundant auxiliary converters may increase the operational availability of the blade pitch system, and may reduce the frequency of reparations.

Some implementations of the various methods according to the present invention will be described in following paragraphs taking as reference the embodiment of the system of FIG. 2. It should be clear however that they may equally well be applied in the examples of the other figures.

According to the example of FIG. 2, each of the motors 101, 201 has one auxiliary set of windings 103, 203 (apart from the main set of windings 102, 202).

In one implementation according to the present invention, for each multi winding motor 101;201 for which one of the auxiliary independent power electronic converters 104;204 is active, it is repeatedly checked if said multi winding motor 101;201 exceeds a predetermined load threshold. In case of one of said multi winding motors 101;201 exceeding a predetermined load threshold, one of the other auxiliary independent power electronic converters 104;204 related to said multi winding motor 101;201 may be activated. These operations may be executed for each multi winding motor 101;201 in a substantially continuous manner, so that a continuous monitoring of the multi winding motors 101;201 can be established.

In another implementation, some of the multi winding motors may comprise more than one auxiliary set of windings. In this kind of implementation, the status of the auxiliary independent power electronic converters may be checked for each multi winding motor 101;201 for which one of the auxiliary independent power electronic converters 104;204 is active. In case of detecting malfunction of said active auxiliary independent power electronic converter 104;204, one of the other auxiliary independent power electronic converters 104;204 related to said multi winding motor 101;201 may be activated. Said operations executed for each multi winding motor 101;201 may be repeated, preferably in a substantially continuous manner, so that a continuous monitoring of the multi winding motors 101;201 is undertaken.

In other implementations, in a similar manner, the status of the main electronic converter may be checked substantially continuously. If the main power electronic converter fails, an auxiliary power electronic converter may be activated to control an auxiliary control winding set.

In some cases, if a failure of the main electronic converter, a first auxiliary converter or e.g. the main power line is noted, the activated auxiliary independent power electronic converter 104;204 may act on its related auxiliary independent sets of control windings 103;203 in a way that the rotor blade pitch angle is changed to an angle corresponding to a vane position of the blade. By putting the blades in their vane position, serious damages on the blades and/or on other related components may be avoided, which increases the reliability of the method when applied to the blade pitch system 100 of the invention.

Figure 3:
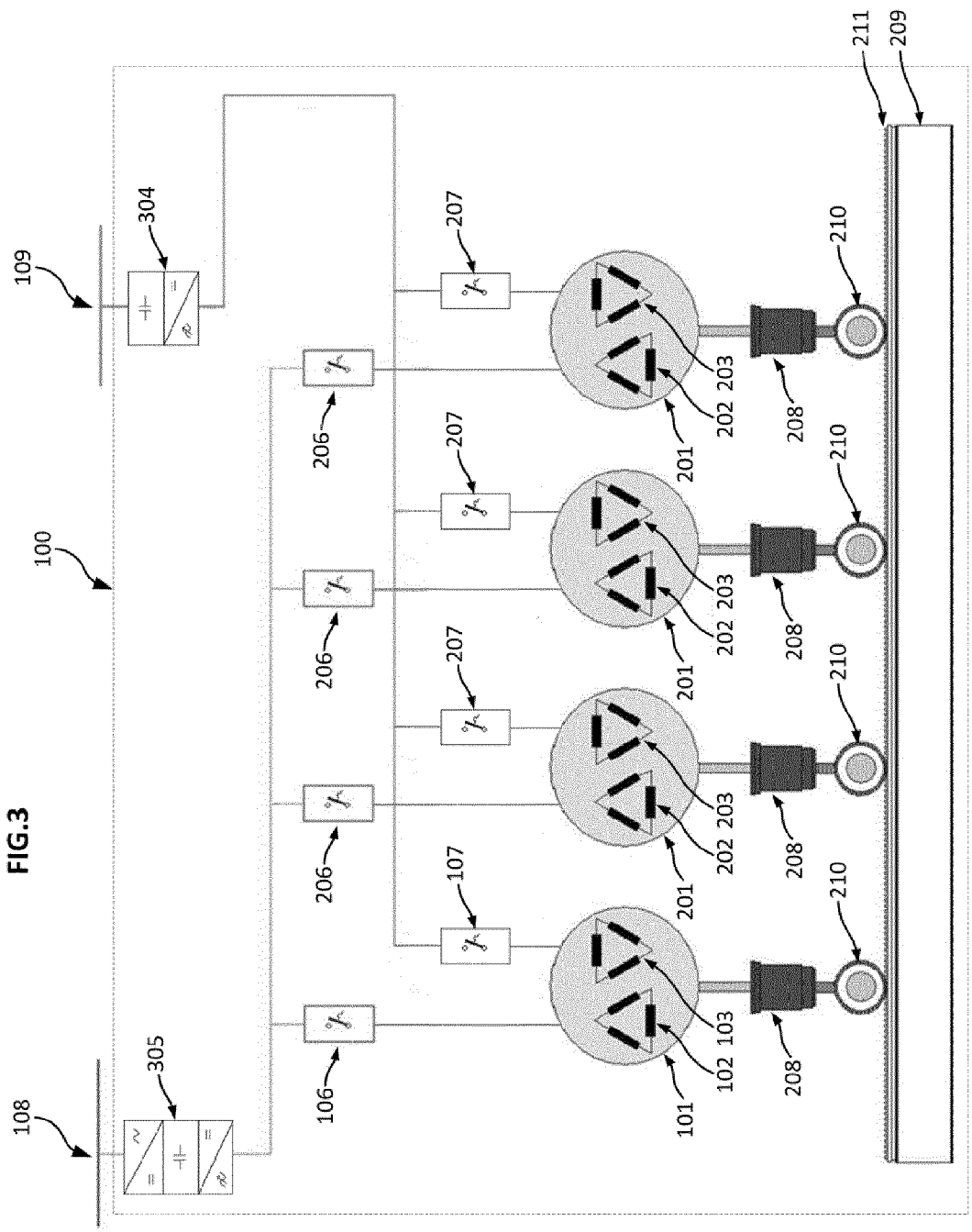
FIG. 3 is a schematic representation of a blade pitch system according to a third embodiment of the invention.

FIG. 3 shows another embodiment of the invention, which is also based on the use of four multi winding motors 101,201 (similar to the system of FIG. 2). However, one difference with the previous embodiment is that a single main independent power electronic converter 305 can control all the main independent sets of control windings 101,201 of said four motors 101,201. And a single auxiliary independent power electronic converter 304 can control all the auxiliary independent sets of control windings 103,203 of said four motors 101,201.

In the embodiment of FIG. 3, the number of converters has been reduced with respect to the embodiment of FIG. 2. The redundancy and reliability of the system may thus be slightly lower. Nevertheless, a system according to this embodiment may be cheaper.

In some embodiments of the invention, at least one of the auxiliary independent set of control windings 103;203 may have a higher number of poles than its corresponding main independent set of control windings 102;202. This feature allows producing higher torque with lower power, so that the auxiliary converters may be simpler and cheaper, which may decrease the overall cost of the blade pitch system.

Figure 4:
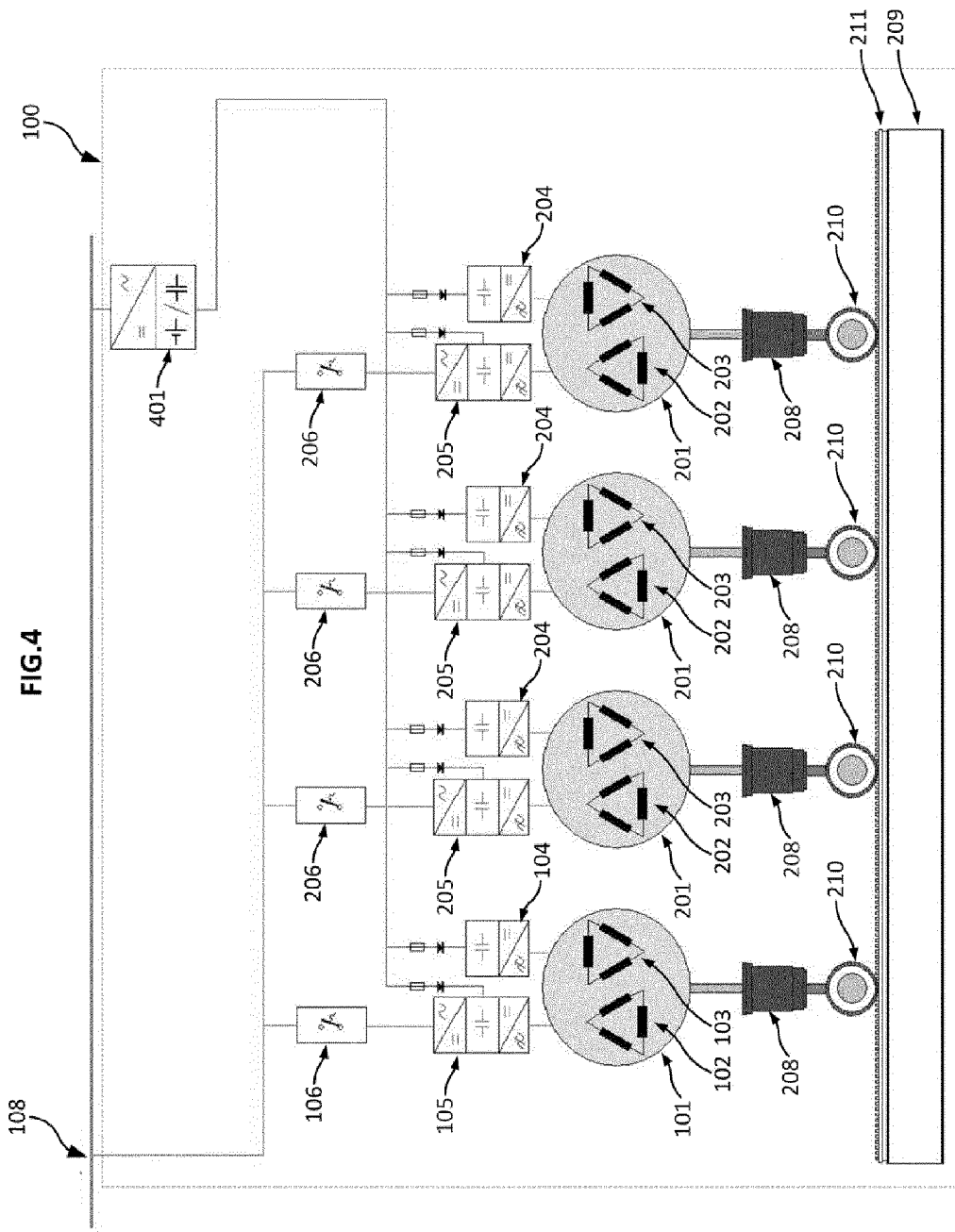
FIG. 4 is a schematic representation of a blade pitch system according to a fourth embodiment of the invention.

FIG. 4 schematically illustrates yet a further embodiment. In this example, four multi winding motors 101, 201 are provided for each of the blades. Each of the motors has its own main electronic power converter with corresponding main winding one or more auxiliary converters with corresponding auxiliary windings control In this example, the blade pitch system may furthermore comprise at least one power storage system 401 for storing power and supplying said stored power to either the main power electronic converters 104;105 or the auxiliary power electronic converters 204;205. Such a power storage system 401 may e.g. consist of batteries or super-capacitors, and has the function of providing DC power to the converters when it is needed, i.e. when the main power line fails. Under normal circumstances, the power storage is charged by the main power line. An auxiliary power line is not provided in this embodiment. In alternative embodiments, the power storage may be stand-alone.

In the example of FIG. 4, each bus connecting the batteries (power storage) 401 and the converters 104;105; 204;205 may comprise protective elements, e.g. fuses and diodes, aimed at avoiding damage in the batteries 401 as consequence of retro-voltages from the converters 104;105; 204;205.

In FIG. 4, the DC bus connecting the energy power storage system 401 with converters 105;104;204;205 is connected to the DC link of each converter, since, in this case, the power inputted to the converters is DC power. Also, in this example, the output of the power electronic converters is AC power, since it is assumed that the pitch motors are AC motors. This however may vary.

In an alternative embodiment, each main independent power electronic converter 105;205 may be connected to a main power line 108, and each auxiliary independent power electronic converter 104;204 may be connected to an auxiliary power line (similar to what was described with respect to the configurations of FIGS. 1, 2 and 3) and an additional power storage system may be provided for providing power when one or both the power lines fail.

In some embodiments, the auxiliary power line may be a DC power line. The converters used in the system may be selected in accordance with this arrangement.

Figure 5:
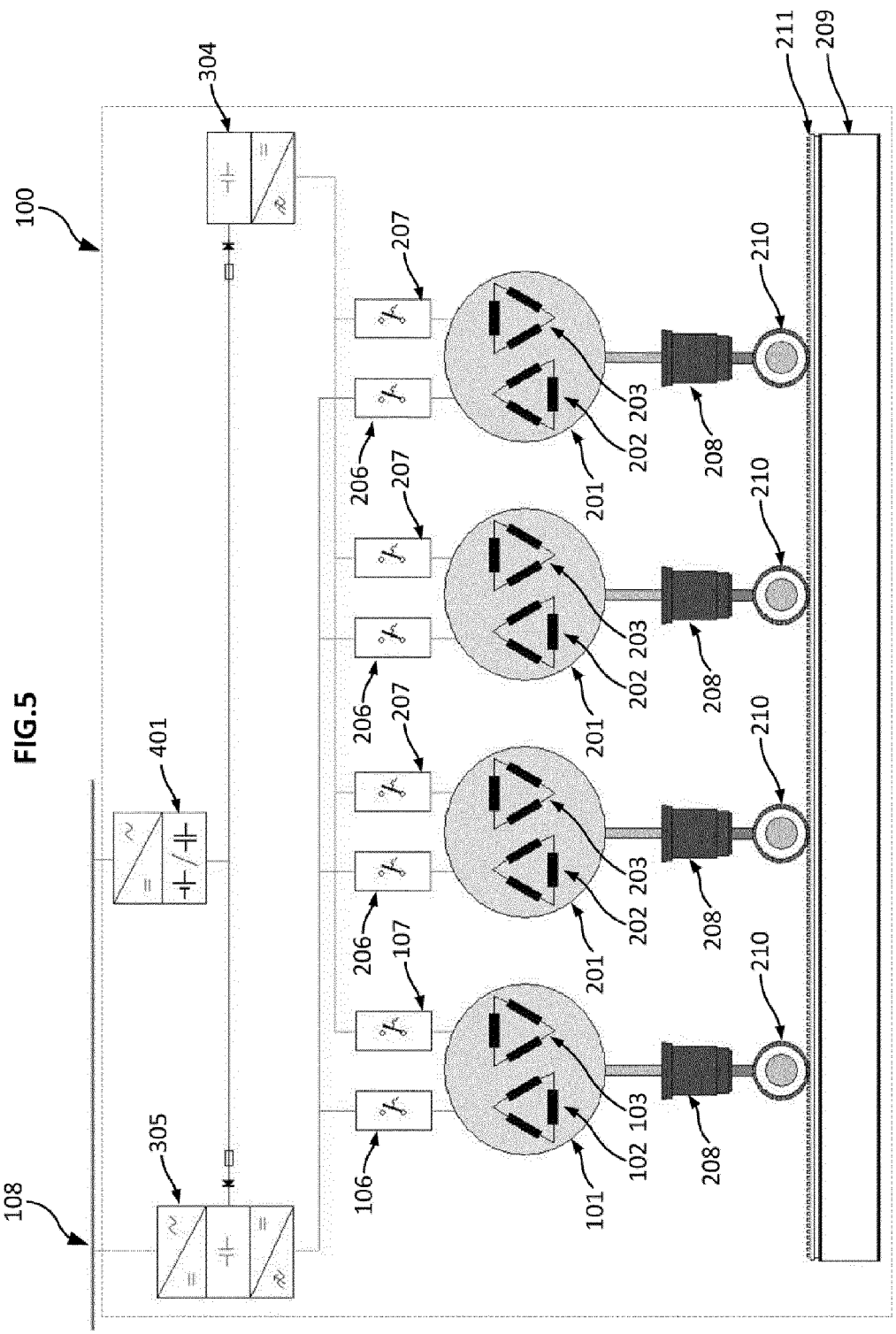
FIG. 5 is a schematic representation of a blade pitch system according to yet another embodiment of the invention.

Yet a further implementation of the invention is shown in FIG. 5. The system of FIG. 5 is very similar to the one shown in FIG. 4. They differ, however, in that the embodiment of FIG. 4 is based on a converter 105;104;204;205 for each set of windings 102;103;202;203 (relation one-to-one), whereas the embodiment of FIG. 5 is based on a main converter 305 for all the main sets of windings 102;202 and on an auxiliary converter 304 for all the auxiliary sets of control windings 103;203 (relation one-to-several). The functioning is the same as previously described with respect to FIG. 4.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A method for operating a blade pitch system having at least one multi winding motor operationally connected to at least one actuator for changing a rotor blade pitch angle, said at least one multi winding motor comprising a main independent set of control windings and at least one auxiliary independent set of control windings, and at least one main independent power electronic converter for controlling the main independent set of control windings and at least one auxiliary independent power electronic converter for controlling the at least one auxiliary independent set of control windings, the method comprising:

electrically coupling the at least one main independent power electronic converter to a main power line;

electrically coupling the at least one auxiliary independent power electronic converter to an auxiliary power line, wherein the at least one main independent power electronic converter is permanently electrically isolated from the auxiliary power line and the at least one auxiliary independent power electronic converter is permanently electrically isolated from the main power line; and, for each multi winding motor for which the at least one main independent power electronic converter is active:
checking if said multi winding motor exceeds a predetermined load threshold;
in case of said multi winding motor exceeding said predetermined threshold:

activating one of the at least one auxiliary independent power electronic converters related to said multi winding motor.

2. The method according to claim 1, further comprising:
for each multi winding motor for which one of the at least one auxiliary independent power electronic converters is active:
  checking if said multi winding motor exceeds a predetermined load threshold;
  in case of said multi winding motor exceeding said predetermined threshold:
    activating a second of the at least one auxiliary independent power electronic converters related to said multi winding motor.

3. A method for operating a blade pitch system having at least one multi winding motor operationally connected to at least one actuator for changing a rotor blade pitch angle, said at least one multi winding motor comprising a main independent set of control windings and at least one auxiliary independent set of control windings and having at least one main independent power electronic converter for controlling the main independent set of control windings and at least one auxiliary independent power electronic converter for controlling the at least one auxiliary independent set of control windings, the method comprising:
  electrically coupling the at least one main independent power electronic converter to a main power line;
  electrically coupling the at least one auxiliary independent power electronic converter to an auxiliary power line, wherein the at least one main independent power electronic converter is permanently electrically isolated from the auxiliary power line and the at least one auxiliary independent power electronic converter is permanently electrically isolated from the main power line; and
  for each multi winding motor for which the at least one main independent power electronic converter is active:
    checking the status of said active main independent power electronic converter;
    in case of detecting a malfunction of said active main independent power electronic converter:
      activating one of the at least one auxiliary independent power electronic converters related to said multi winding motor.

4. The method according to claim 3, further comprising:
for each multi winding motor for which one of the at least one auxiliary independent power electronic converters is active:
  checking the status of said active auxiliary independent power electronic converter;
  in case of detecting a malfunction of said active auxiliary independent power electronic converter:
    activating a second of the at least one auxiliary independent power electronic converters related to said multi winding motor.

5. The method according to claim 1, further comprising:
each activated auxiliary independent power electronic converter acting on its related auxiliary independent sets of control windings in a way that the rotor blade pitch angle is changed to an angle corresponding to a vane position of the blade.

6. The method according claim 3, further comprising:
each activated auxiliary independent power electronic converter acting on its related auxiliary independent sets of control windings in a way that the rotor blade pitch angle is changed to an angle corresponding to a vane position of the blade.

* * * * *